United States Patent Office 3,095,532
Patented June 25, 1963

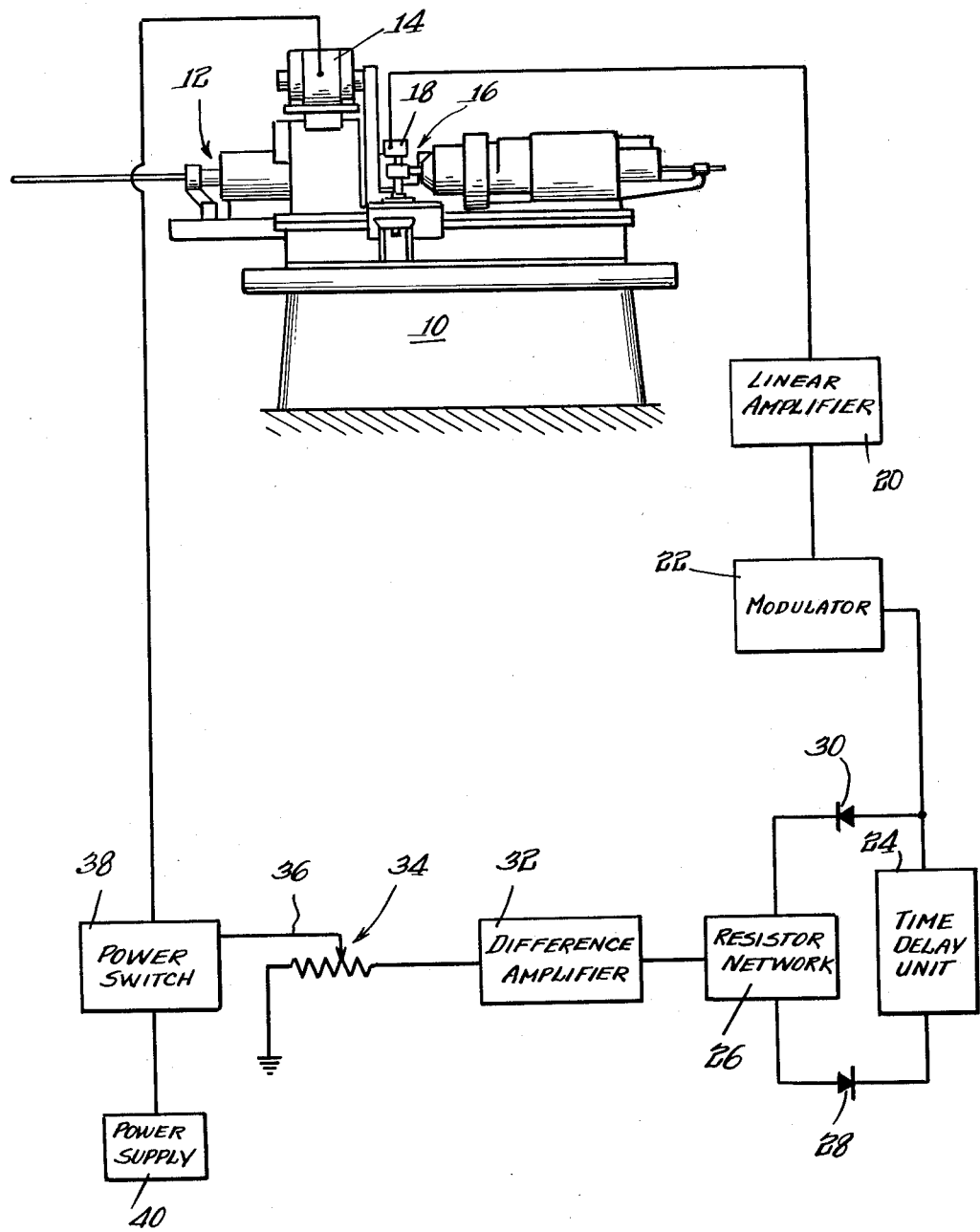

3,095,532
VIBRATION RESPONSIVE SYSTEM FOR STOPPING MOTOR DRIVEN MACHINES
Peter G. Floyd, 857 Ainslie, Chicago 40, Ill.
Filed June 29, 1959, Ser. No. 823,681
6 Claims. (Cl. 318—469)

This invention relates generally to cyclically operating machines and more particularly to apparatus for indicating deviations in the operation of a cyclically operating machine.

In one specific aspect, the present invention relates to apparatus for indicating malfunctions in an automatic screw machine.

Machine tools, such as screw machines, punch presses, milling machines and the like, vibrate differently according to the work being performed; and ordinarily, the steps required in performing a given piece of work follow an ordered sequence. This operational sequence produces a corresponding pattern of vibration; and since the work performed is generally of a repetitive nature, the vibrational pattern recurs for each normal work cycle.

It has been found, however, that deviations in the operation of the machine produce deviations in the vibrational pattern. The abnormal vibrations arise from the operational deviations such as might result from malfunctioning of the machine, broken or worn tools, defective raw material supplies or the like. A machine, of course, should not be allowed to continue operation under such conditions.

Therefore, a general object of the present invention is to provide a novel apparatus for indicating deviations in the operation of a cyclically operating machine.

Another object of the invention is to provide an indicating apparatus which provides instantaneous response to deviations in the operation of a cyclically operating machine.

Yet another object of the invention is to provide indicating apparatus by the use of which damage to a machine tool is prevented.

A further object of the invention is to provide an apparatus for indicating deviations in the operation of a cyclically operating machine, which apparatus permits selection of the level of deviation which will be tolerated.

A still further object of the invention is to provide such apparatus that gives an indication of the condition and adjustment of the tools and gives a measure of the quality of the pieces being produced.

And a still further object of the invention is to provide apparatus for indicating deviations in the operation of a cyclically operating machine, which apparatus compares instantly occurring vibrations with a standard vibrational pattern, any substantial deviations given rise to appropriate response.

Additional objects and features of the invention pertain to the particular structure arrangements whereby the above objects are attained.

In order that the principle of the invention may be readily understood, a single embodiment thereof applied to an automatic screw machine, but to which the application is not to be restricted, is shown in the accompanying drawing.

Referring now in detail to the drawing, an automatic screw machine 10 is shown to include a stock feeding mechanism 12, a drive-motor 14, and a work station 16. In accordance with the invention, a mechanical-electrical transducer 18, desirably a piezoelectric crystal, is secured to the screw machine 10 in the approximately vicinity of work station 16. So located, transducer 18 is able to sense the vibrations occurring at work station 16, producing in response an output wavetrain representative of those vibrations.

The output of transducer 18 is directed to the linear amplifier 20 for purposes of increasing the amplitude of the signal. Under certain circumstances, it has proved advantageous to direct the output of amplifier 20 to the modulator 22 which, as is customary, contains a relatively high frequency signal generator. Modulator 22 impresses the low frequency signal from amplifier 20 on the high frequency signal from its self-contained signal generator.

The output signal from modulator 22 is then fed into time delay unit 24 where it is held for an appropriate interval and subsequently delivered to the match point of resistor network 26. Time delay unit 24 preferably takes the form of a magnetic recording device in which the speed of rotation of the magnetic tape or drum is adjusted to give one revolution per machine cycle. Alternatively, the playback head may be spaced from the recording head a sufficient distance to provide playback upon the completion of one machine cycle. The playback signal from time delay unit 24 is rectified by a diode 28 of predetermined polarity whereby, for example, only negative-going portions of the signal are passed to the resistor network 26.

The output signal from modulator 22, besides being applied to the time delay unit 24, is directed to a diode 30 for rectification. Diode 30 is polarized oppositely to diode 28 and, accordingly, passes only the positive-going portions of the signal wavetrain.

The delayed signal from time delay unit 24 and the instantaneously occurring signal from modulator 22 are compared across resistor network 26, any variations in amplitude or phase of the two signals yielding an error signal.

Any error signal existing at the match point of resistor network 26 is fed to the difference amplifier 32 from whence it is directed to the potentiometer 34. The sliding tap 36 of potentiometer 34 is adapted to set the level of signal above which the normally closed power switch 38 will be opened by the error signal from difference amplifier 32. As will be recognized, operation of switch 38 controls the application of power from a suitable power supply 40 to the drive-motor 14. Furthermore, the error signal from difference amplifier 32, as passed by potentiometer 34, may be equally well employed to operate a signal lamp or a buzzer.

Suitable sources supply electrical power to the various component devices described hereinabove.

From the descriptions thus far given, it is apparent that as the screw machine 10 operates, a vibrational pattern will be set up corresponding to the work cycle of the machine. This vibrational pattern will cause transducer 18 to generate a signal wavetrain which will be recorded in time delay unit 24.

It is recognized, of course, that, when operation is initiated, the first signal wavetrain passing through resistor network 26 will create an error signal since no signal will have been previously stored in delay unit 24. Accordingly, power switch 38 is manually operated during the first machine cycle in order to prevent the error signal from interrupting operation of machine 10.

When a signal wavetrain corresponding to the vibrational pattern of the machine operating cycle is stored in delay unit 24, subsequent machine cycles will produce signal wavetrains which will be each compared with the immediately preceding wavetrain in resistor network 26.

Should one of these succeeding wavetrains exhibit a deviation in amplitude or phase, as for example might result from the failure of a tool at work station 16 or an interruption of the feeding of the raw material stock, an error signal will be developed in resistor network 26. This error signal will be passed by potentiometer 34 if it is above a preselected value; and accordingly, power switch 38 will be operated to break the circuit from power supply 40 to motor 14, thus shutting off machine 10. Error signals below the preselected value, of course, will not disturb operation of machine 10.

As will be recognized, potentiometer 34 may be adjusted to respond intelligently to the signals passed by difference amplifier 32, i.e. potentiometer 34 may be operated to tolerate certain variations in the signal wavetrains produced by the vibrations emanating from screw machine 10.

The specific example herein shown and described as illustrative only. Various changes in structure will, no doubt, occur to those skilled in the art; and these changes are to be understood as forming a part of this invention in so far as they fall within the spirit of the scope of the appended claims.

The invention is claimed as follows:

1. Apparatus responsive to mechanical machine tool vibrations for continuously controlling the operation of an initially started cyclically operable machine tool generating a pattern of mechanical vibrations corresponding with a cycle of operation, said apparatus comprising: fixed mechanical-electrical transducing means arranged in adjacency with said machine tool to sense said vibrations and produce an electrical output indicative thereof; time delay means receiving said output and delaying a portion of said output corresponding with one machine cycle; circuit means for comparing the instant output of said transducing means with the delayed output signal of said time delay means to yield an error signal representative of the deviation in the vibrational pattern of the instantly occurring machine cycle from the vibrational pattern of the machine cycle the signal of which has been stored in said time delay means; and means responsive to said error signal for terminating operation of said machine tool when the magnitude of said error signal exceeds a predetermined value corresponding with the maximum allowable deviation in said vibrational patterns.

2. Apparatus according to claim 1 wherein said circuit means is a resistor network.

3. Apparatus according to claim 1 wherein the instant machine cycle is compared with the immediately preceding machine cycle.

4. Apparatus according to claim 1 wherein said time delay means includes a magnetic recording device.

5. Apparatus responsive to mechanical machine tool vibrations for continuously controlling the operation of an initially started cyclically operable machine tool generating a pattern of mechanical vibrations corresponding with a cycle of operation; and comprising fixed mechanical-electrical transducing means including a piezoelectric device arranged in adjacency with said machine tool to sense the vibrations emanating therefrom and produce an electrical output indicative of the operation thereof, time delay means including magnetic recording means receiving the output of said transducing means and delaying a portion thereof corresponding with one cycle of machine operation, circuit means including a resistor network and oppositely polarized diodes for comparing the instant output of said transducing means with the delayed output signal of said time delay means to yield an error signal representing deviation in the vibration patterns of the instant output cycle with the output signal previously stored in said time delay means, and means settable to a predetermined value for responding to the error signal for terminating operation of the machine tool when the magnitude of error signal exceeds said predetermined value.

6. Apparatus as claimed above, wherein the output of said transducing means is amplified and modulated for reception by said time delay means.

References Cited in the file of this patent

UNITED STATES PATENTS

| | | |
|---|---|---|
| 2,410,424 | Brown | Nov. 5, 1946 |
| 2,493,543 | Merchant | Jan. 3, 1950 |
| 2,523,283 | Dickson | Sept. 26, 1950 |
| 2,597,636 | Hall et al. | May 20, 1952 |
| 2,866,301 | Koulicovitch et al. | Dec. 30, 1958 |
| 2,870,430 | Hancock | Jan. 20, 1959 |
| 2,882,525 | Young | Apr. 14, 1959 |